United States Patent [19]

Reiffenrath et al.

[11] Patent Number: 5,204,019

[45] Date of Patent: * Apr. 20, 1993

[54] 2,3-DIFLUOROBIPHENYLS

[75] Inventors: Volker Reiffenrath, Rossdorf; Joachim Krause, Dieburg; Andreas Wächtler, Griesheim; Georg Weber, Erzhausen; Ulrich Finkenzeller, Plankstadt, all of Fed. Rep. of Germany; David Coates, Wimborne, Great Britain; Ian C. Sage, Broadstone, Great Britain; Simon Greenfield, Poole, Great Britain; George W. Gray, Cottingham, Great Britain; Michael Hird, Hull, Great Britain; David Lacey, Hull, Great Britain; Kenneth J. Toyne, Hull, Great Britain

[73] Assignee: Merck Patent Gesellschaft Mit Beschrankter Haftung, Darmstadt, Fed. Rep. of Germany

[*] Notice: The portion of the term of this patent subsequent to Mar. 30, 2010 has been disclaimed.

[21] Appl. No.: 362,470

[22] PCT Filed: Feb. 27, 1989

[86] PCT No.: PCT/EP89/00180

§ 371 Date: May 15, 1989

§ 102(e) Date: May 15, 1989

[87] PCT Pub. No.: WO89/08687

PCT Pub. Date: Sep. 21, 1989

[30] Foreign Application Priority Data

Mar. 10, 1988 [DE] Fed. Rep. of Germany ....... 3807861

[51] Int. Cl.$^5$ ............ C09K 19/12; C09K 19/20; C09K 19/34; C09K 19/30
[52] U.S. Cl. .................. 252/299.66; 252/299.63; 252/299.67; 252/299.61; 252/299.65; 560/65; 560/102
[58] Field of Search ......... 252/299.63, 299.66, 252/299.61, 299.65, 299.67; 560/65, 102

[56] References Cited

U.S. PATENT DOCUMENTS

| 4,368,135 | 1/1983 | Osman | 252/299.63 |
|---|---|---|---|
| 4,415,470 | 11/1983 | Eidenschink et al. | 252/299.63 |
| 4,514,317 | 4/1985 | Tuong et al. | 252/299.62 |
| 4,545,922 | 10/1985 | Eidenschink et al. | 252/299.63 |
| 4,551,264 | 11/1985 | Eidenschink et al. | 252/299.62 |
| 4,602,851 | 7/1986 | Jenner et al. | 350/350 R |
| 4,606,845 | 8/1986 | Romer et al. | 252/299.63 |
| 4,621,901 | 11/1986 | Petrzilka et al. | 350/350 R |
| 4,637,897 | 1/1987 | Kelly | 252/299.63 |
| 4,659,502 | 4/1987 | Fearon et al. | 252/299.61 |
| 4,664,840 | 5/1987 | Osman | 252/299.63 |
| 4,710,315 | 12/1987 | Schad et al. | 252/299.63 |
| 4,724,097 | 2/1988 | Romer et al. | 252/299.63 |
| 4,753,752 | 6/1988 | Raynes et al. | 252/299.65 |
| 4,776,973 | 10/1988 | Bofinger et al. | 252/299.61 |
| 4,780,242 | 10/1988 | Miyazawa et al. | 252/299.65 |
| 4,820,839 | 4/1989 | Krause et al. | 544/316 |
| 4,834,904 | 5/1989 | Krause et al. | 252/299.01 |
| 4,874,544 | 10/1989 | Yong et al. | 252/299.61 |
| 4,897,216 | 1/1990 | Reiffenrath et al. | 252/299.63 |
| 4,911,863 | 3/1990 | Sage et al. | 252/299.65 |
| 4,925,278 | 5/1990 | Buchecker et al. | 350/350.5 |
| 4,925,590 | 5/1990 | Reiffenrath et al. | 252/299.61 |
| 4,986,931 | 1/1991 | Eidenschink et al. | 252/299.63 |
| 5,047,170 | 9/1991 | Huynh-ba et al. | 252/299.6 |
| 5,087,764 | 2/1992 | Reiffenrath et al. | 568/656 |

FOREIGN PATENT DOCUMENTS

| 0051738 | 3/1981 | European Pat. Off. . |
|---|---|---|
| 0133489 | 7/1984 | European Pat. Off. . |
| 2939782 | 4/1981 | Fed. Rep. of Germany | 252/299.64 |
| WO88/02130 | 3/1988 | PCT Int'l Appl. . |

Primary Examiner—Robert L. Stoll
Assistant Examiner—C. Harris
Attorney, Agent, or Firm—Millen, White, Zelano and Branigan

[57] ABSTRACT

4-$Q^1$-4'-$Q^2$-2,3-Difluorobiphenyls wherein
$Q^1$ and $Q^2$ independently of one another are each R or R-$A^1$-$A^2$-Z in which
R (sic) alkyl having 1-15 C atoms or alkenyl having 3-15 C atoms each of which is unsubstituted or monosubstituted by cyano or at least monosubstituted by fluorine or chlorine, and in which in each case one or two non-adjacent $CH_2$ groups can also be replaced by —O—, —CO—, —O—CO, —CO—O— or —O—COO—, (sic) —COO—, —O—CO—, —$CH_2$O, —O—$CH_2$—, —$CH_2CH_2$— or a single bond, and
$A^1$ and $A^2$ independently of one another .. (sic) each 1,4-phenylene which is unsubstituted or substituted by one or two fluorine atoms, and in which one or two CH groups can also be replaced by N, or trans-1,4-cyclohexylene wherein one or two non-adjacent $CH_2$ groups can also be replaced by —O—, and one of the two groups $A^1$ and $A^2$ can also be a single bond, subject to the proviso that Z is —CO—O, —O—CO—, —$CH_2O$—, —$OCH_2$— or —$CH_2CH_2$—, if one of the groups $Q^1$ or $Q^2$ is alkyl or alkoxy and the other group $Q^1$ or $Q^2$ is R-$A^1$-$A^2$-Z wherein one of the two groups $A^1$ and $A^2$ is a single bond, are suitable for use as components of liquid-crystal media.

11 Claims, No Drawings

2,3-DIFLUOROBIPHENYLS

SUMMARY OF THE INVENTION

The invention relates to 4-$Q^1$-4'-$Q^2$-2,3-difluorobiphenyls wherein $Q^1$ and $Q^2$ independently of one another are each R or R-$A^1$-$A^2$-Z in which R is alkyl having 1-15 C atoms or alkenyl having 3-15 C atoms each of which is unsubstituted or monosubstituted by cyano or at least monosubstituted by fluorine or chlorine, and in which in each case one or two non-adjacent $CH_2$ groups can also be replaced by —O—, —CO—, —O—CO, —CO—O— or —O—COO—, Z is —COO—, —O—CO—, —$CH_2$O, —O—$CH_2$—, —$CH_2CH_2$—or a single bond, and $A^1$ and $A^2$ independently of one another... are each 1,4-phenylene which is unsubstituted or substituted by one or two fluorine atoms, and in which one or two CH groups can also be replaced by N, or trans-1,4-cyclohexylene wherein one or two non-adjacent $CH_2$ groups can also be replaced by —O—, and one of the two groups $A^1$ and $A^2$ can also be a single bond, subject to the proviso that —O—CO—, —$CH_2$O—, —$OCH_2$— or —$CH_2CH_2$—, if one of the groups $Q^1$ or $Q^2$ is alkyl or alkoxy and the other group $Q^1$ or $Q^2$ is R—$A^1$—$A^2$—Z wherein one of the two groups $A^1$ and $A^2$ is a single bond.

For the sake of simplicity in the following text Cyc is a 1,4-cyclohexylene group, Phe is a 1,4-phenylene group, Pyd is a pyridine-2,5-diyl group, Pyr is a pyrimidine-2,5-diyl group and Pyn is a pyrazine-2,5-diyl group, it being possible for these groups to be unsubstituted or substituted by one or two fluorine atoms. Preferably, these groups are unsubstituted.

$BPF_2$ is a group of the formula

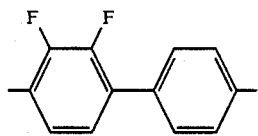

The compounds of the formula I can be used as components of liquid-crystal phases, especially for displays based on the principle of the twisted cell, the guest-host effect, the effect of the deformation of aligned phases or the effect of dynamic scattering.

The compounds of the formula I are distinguished by a markedly negative anisotropy of the dielectric constant and, in an electric field, are aligned with the longitudinal axes of their molecules perpendicular to the direction of the field. This effect is known and is utilized to control optical transparency in various liquid-crystal displays, for example in liquid-crystal cells of the light scattering type (dynamic scattering), of the so-called DAP type (deformation of aligned phases) or of the ECB type (electrically controlled birefringence) or the guest/host type (guest/host interaction).

Compounds of the formula I are also suitable for use as components of chirally tilted smectic phases. Chirally tilted smectic, liquid-crystal phases having ferroelectric properties can be prepared by adding a suitable chiral doping substance to base mixtures containing one or more tilted smectic phases (L. A. Veresnev et al., Mol. Cryst. Liq. Cryst. 89, 327 (1982); H. R. Brand et al., J. Physique 44 (lett.), L-771 (1983). Phases of this type can be used as dielectrics for high-speed displays based on the principle described by Clark and Lagerwall of SSFLC technology (N. A. Clark and S. T. Lagerwall, Appl. Phys. Lett. 36, 899 (1980); U.S. Pat. No. 4,367,924) based on the ferroelectric properties of the chirally tilted phase.

At present a number of liquid-crystal compounds having a weakly negative dielectric anisotropy have already been synthesized. On the other hand, relatively few liquid crystal components having a large negative anisotropy of the dielectric constant are yet known. In addition, the latter generally exhibit disadvantages, such as, for example, poor solubility in mixtures, high viscosity, high melting points and chemical instability. There is, therefore, a need for further compounds having negative dielectric anisotropy which make it possible to improve further the properties of mixtures for a wide variety of electrooptical applications.

Liquid-crystal compounds having negative dielectric anisotropy and containing two or three rings linked via carboxyl groups or a covalent bond and one or more lateral groups, such as halogen, cyano or nitro groups, are known from German Patents 2,240,864, 2,613,293, 2,835,662 and 2,836,086 and European Patent 023,728.

The compounds claimed here are embraced within a wide formula in European Patent 084,194. No individual compounds of the formula according to the invention are mentioned in that text, however. It was thus not possible, from the state of the art, for those skilled in the art either to deduce possible means of synthesizing the claimed compounds in a simple manner or to realize that the compounds according to the invention have in most cases advantageously situated mesophase ranges and that they are distinguished by a large negative dielectric anisotropy while having at the same time a low viscosity.

There is also a lack of any reference to the possible use of the compounds according to the invention in displays based on the SSFLC technology, since the compounds claimed therein have low smectic tendencies.

Dibenzoic acid esters of 2,3-dichlorohydroquinone are also known (for example Bristol et al., J. Org. Chem. 39, 3138 (1974) or Clanderman et al., J. Am. Chem. Soc. 97, 1585 (1975)), but these are monotropic or have very small mesophase ranges. The esters of 4-hydroxy-2,3-dichlorobenzoic acid described by Eidenschink et al. (Angew. Chem. 89, 103 (1977)) also have only narrow mesophase ranges.

The 4-alkyl-2,3-dichlorophenyl-4'-alkylbicyclohexyl-4-carboxylic acid esters disclosed in German Offenlegungsschrift 2,933,563 do not permit industrial application because of their high viscosity.

The object of the invention was to indicate stable, liquid-crystal or mesogenic compounds having a large negative dielectric anisotropy and, at the same time, a low viscosity.

It has been found that the compounds of the formula I are excellently suitable for use as components of liquid-crystal phases. In particular, they make it possible to prepare stable, liquid-crystal media having a wide mesophase range and a comparatively low viscosity.

The compounds of the formula I are also suitable for use as components of chirally tilted, smectic, liquid-crystal media.

In addition, the provision of the compounds of the formula I widens considerably, in a very general manner, the range of liquid-crystal substances suitable from various aspects of application technology for the preparation of liquid-crystal mixtures.

The compounds of the formula I possess a wide range of applications. Depending on the selection of the substituents, these compounds can be used as the base materials of which liquid-crystal phases are predominantly composed; it is also possible, however, to add compounds of the formula I to liquid-crystal base materials belonging to other classes of compounds, in order to vary, for example, the dielectric and/or optical anisotropy and/or the viscosity and/or the spontaneous polarization and/or the phase ranges and/or the tilt angle and/or the pitch of such a dielectric.

The compounds of the formula I are also suitable for use as intermediate products for the preparation of other substances which can be used as constituents of liquid-crystal dielectrics.

In the pure state, the compounds of the formula I are colorless and they form liquid-crystal mesophases within a temperature range which is advantageously situated for electrooptical use. They are very stable to chemicals, heat and light.

The invention therefore relates to the compounds of the formula I, in particular the compounds of the formula Ia and Ib

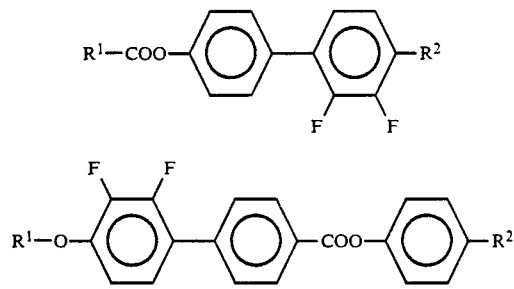

wherein $R^1$ and $R^2$ independently of one another are each alkyl having 1-15 C atoms.

It also relates to intermediate products of the formulae Ic and Id

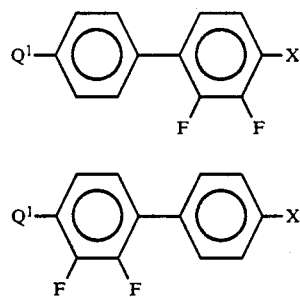

wherein $Q^1$ has the meaning indicated and X is OH, COOH or halogen.

It also relates to a process for the preparation of the compounds of the formulae I, Ia and Ib which is characterized in that a suitable carboxylic acid or one of its reactive derivatives is reacted with a suitable hydroxyl compound or one of its reactive derivatives.

The invention also relates to the use of the compounds of the formula I as components of liquid-crystal media. The invention also relates to liquid-crystal media containing at least one compound of the formula I and to liquid-crystal display elements containing media of this type. Phases of this type exhibit particularly advantageous elastic constants, and, owing to their low $\Delta\epsilon/\epsilon_1$ values, are particularly suitable for TFT mixtures.

In the preceding and following text $Q^1$, $Q^2$, $A^1$, $A^2$, R and Z have the meaning indicated, unless anything else is expressly noted.

Accordingly, the compounds of the formula I embrace preferred compounds of the partial formula Ie (containing two rings) and partial formulae If to Ii (containing three rings) and Ij to In (containing four rings):

| | |
|---|---|
| R—BPF$_2$—R | Ie |
| R-A$^1$-BPF$_2$—R | If |
| R—BPF$_2$-A$^1$-R | Ig |
| R-A$^1$-Z-BPF$_2$—R | Ih |
| R—BPF$_2$-Z-A$^1$-R | Ii |
| R-A$^1$-BPF$_2$-A$^1$-R | Ij |
| R-A$^1$-Z -BPF$_2$-A$^1$-R | Ik |
| R-A$^1$-BPF$_2$-Z-A$^1$-R | Il |
| R-A$^1$-A$^2$-BPF$_2$—R | Im |
| R—BPF$_2$-A$^1$-A$^2$-R | In |

Amongst these, the compounds of the partial formulae Ia to Ih are particularly preferred.

Amongst the compounds of the formula Ih, those of the formulae Ih1 and Ih2 are particularly preferred.

In the compounds of the preceding and following formulae the Rs independently of one another are each preferably alkyl or alkoxy.

Compounds of preceding and following formulae in which one of the radicals R is alkenyl or oxaalkyl (for example alkoxymethyl) are also preferred.

$A^1$ and $A^2$ are preferably unsubstituted 1,4-phenylene, Cyc, Pyd or Pyr; the compound of the formula I preferably contains not more than one of the radicals Pyd, Pyn, Pyr or 2,3-difluoro-1,4-phenylene in each case.

In the preceding and following formulae the radicals R preferably have 2-12 C atoms, in particular 3-10 C atoms. One or two $CH_2$ groups in R can also be replaced.

Preferably, only one $CH_2$ group is replaced by —O— or —CH=CH—.

In the preceding and following formulae the radicals R are preferably alkyl, alkoxy or another oxaalkyl group, and also alkyl groups in which one or two $CH_2$ groups can be replaced by —CH=CH—.

If the radicals R are alkyl radicals in which one ("alkoxy" or "oxaalkyl") $CH_2$ group or two ("alkoxylalkoxy" or "dioxaalkyl") non-adjacent $CH_2$ groups can also be replaced by O atoms, they can be linear or branched. Preferably, they are linear, have 2, 3, 4, 5, 6 or 7 C atoms and accordingly are preferably ethyl, propyl, butyl, pentyl, hexyl, heptyl, ethoxy, propoxy, butoxy, pentoxy, hexyloxy or heptyloxy, and also methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl is preferably linear 2-oxapropyl (=methoxymethyl), 2-oxabutyl (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl, 1,3-dioxabutyl (=methoxymethoxy), 1,3-, 1,4- or 2,4-dioxapentyl, 1,3-, 1,4-, 1,5-, 2,4-, 2,5- or 3,5-dioxahexyl or 1,3-, 1,4-, 1,5-, 1,6-, 2,4-, 2,5-, 2,6-, 3,5-, 3,6- or 4,6-dioxaheptyl.

If the radicals R are an alkyl radical in which one $CH_2$ group has been replaced by —CH=CH—, the trans form is preferred. This alkenyl radical can be linear or branched. Preferably, it is linear and has 2 to 10 C atoms. Accordingly, it is, in particular, vinyl, prop-1-enyl, prop-2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl or dec-1-, -2-, -3-, -4-, -5-, -6-, -7-, -8- or -9-enyl.

Compounds of the formula I having branched radicals R can occasionally be important owing to improved solubility in the customary liquid-crystal base materials, but are particularly important as chiral doping agents if they are optically active. Smectic compounds of this type are suitable for use as components for ferroelectric materials.

As a rule, branched groups of this type do not contain more than one chain branching. Preferred branched radicals R are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexyloxy, 1-methylhexyloxy, 1-methylheptyloxy, 2-oxa-3-methylbutyl, 3-oxa-4-methylpentyl, 4-methylhexyl, 2-nonyl, 2-decyl, 2-dodecyl, 6-methyloctyloxy, 6-methyloctanoyloxy, 2-methylbutyryloxy, 3-methylvaleryloxy, 5-methylheptyloxycarbonyl, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyloxapentyl, 2-methyloxahexyl, 2-fluoro-3-methylvaleryloxy or 2-fluoro-3-methylbutoxy.

Formula I embraces both the racemates of these compounds and the optical antipodes and mixtures thereof.

Preferred compounds of the formulae I and Ia to In are those in which at least one of the radicals contained therein has one of the preferred meanings indicated.

The compounds of the formula I are prepared by methods known per se, such as are described in the literature (for example in the standard works such as Houben-Weyl, Methoden der Organischen Chemie ("Methods of Organic Chemistry"), Georg-Thieme-Verlag, Stuttgart), in particular under reaction conditions which are known and suitable for the reactions mentioned. In this regard it is also possible to make use of variants which are known per se but not mentioned here in detail.

If desired, the starting materials can also be formed in situ, in a process in which they are not isolated from the reaction mixture, but are immediately reacted further to give the compounds of the formula I.

Compounds of the formula I are accessible starting from 1,2-difluorobenzene. This compound is metalated in accordance with a known process (for example A. M. Roe et al., J. Chem. Soc. Chem. Comm., 22, 582 (1965)) and reacted with the corresponding electrophile. The 1-substituted 2,3-difluorobenzene thus obtained can be used to carry out this reaction sequence a second time with a suitable electrophile, thus affording 1,4-disubstituted 2,3-difluorobenzenes which can, if desired, be converted into the end products in further reaction steps. 1,2-Difluorobenzene or 1-substituted 2,3-difluorobenzene is reacted in an inert solvent, such as diethyl ether, tetrahydrofuran, dimethoxyethane, tert.-butyl methyl ether or dioxane, hydrocarbons, such as hexane, heptane, cyclohexane, benzene or toluene, or mixtures of these solvents, if appropriate with the addition of a complexing agent, such as tetramethylethylenediamine (TMEDA) or hexamethylphosphoric triamide, with phenyllithium, lithium tetramethylpiperidine or n-, sec.- or tert.-butyllithium at temperatures from −100° C. to +50° C., preferably −78° C. to 0° C.

The 2,3-difluorophenyllithium compounds are reacted with the corresponding electrophiles at −100° C. to 0° C., preferably at −50° C. Suitable electrophiles are aldehydes, ketones, nitriles, epoxides, carboxylic acid derivatives, such as esters, anhydrides or halides, halogenoformic acid esters or carbon dioxide.

For the reaction with aliphatic or aromatic halogen compounds, the 2,3-difluorophenyllithium compounds are transmetalated and coupled under conditions of transition metal catalysis. The 2,3-difluorophenylzinc (cf. German Offenlegungsschrift 3,632,410) or -titanium (cf. German Offenlegungsschrift 3,736,489) compounds are particularly suitable for this purpose.

The 2,4-difluorobiphenyls can be prepared, for example, by treating a compound containing H atoms instead of C—C bonds with an oxidizing agent.

Suitable oxidizable groups are preferably cyclohexene rings. Preferred starting materials for the oxidation correspond to the formula

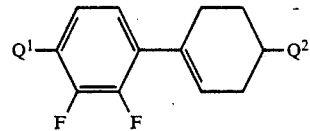

and are converted by oxidation (dehydrogenation) into the compounds according to the invention using standard methods.

The oxidation can, for example, be carried out by catalytic dehydrogenation.

Dehydrogenation by means of 2,3-dichloro-5,6-dicyano-p-benzoquinone (DDQ), chloranil, sulfur or selenium are preferred, however, because of the milder reaction conditions.

The esters according to the invention can be obtained by esterifying the corresponding carboxylic acids (or their reactive derivatives) with alcohols or phenols (or their reactive derivatives).

Suitable reactive derivatives of the carboxylic acids mentioned are, in particular, the acid halides, above all the chlorides and bromides, and also the anhydrides, for example also mixed anhydrides, azides or esters, especially alkyl esters having 1-4 C atoms in the alkyl group.

Suitable reactive derivatives of the alcohols or phenols mentioned are, in particular, the corresponding metal alcoholates or phenates, respectively, preferably those of an alkali metal such as Na or K.

The esterification is advantageously carried out in the presence of an inert solvent. Suitable solvents are, in particular, ethers, such as diethyl ether, di-n-butyl ether, THF, dioxane or anisole, ketones, such as acetone, butanone or cyclohexanone, amides, such as DMF or phosphoric hexamethyltriamide, hydrocarbons, such as benzene, toluene or xylene, halogenated hydrocarbons, such as carbon tetrachloride or tetrachloroethylene, and sulfoxides, such as dimethyl sulfoxide or sulfolane. Solvents which are immiscible with water can, at the same time, advantageously be used for removing, by azeotropic distillation, the water formed in the course of the esterification. Occasionally, it can also be possible to use an excess of an organic base, for example pyridine, quinoline or triethylamine, as the solvent for the esterification. The esterification can also be carried out in the absence of a solvent, for example merely by heating the components in the presence of sodium acetate. The reaction temperature is usually between $-50°$ and $+250°$, preferably between $-20°$ and $+80°$. At these temperatures the esterification reactions are complete after 15 minutes to 48 hours, as a rule.

In an individual case the reaction conditions for the esterification depend largely on the nature of the starting materials used. Thus a free carboxylic acid is, as a rule, reacted with a free alcohol or phenol in the presence of a strong acid, for example a mineral acid, such as hydrochloric acid or sulfuric acid. A preferred reaction procedure is the reaction of an acid anhydride or, in particular, an acid chloride with an alcohol, preferably in a basic medium, important bases being, in particular, alkali metal hydroxides, such as sodium hydroxide or potassium hydroxide, alkali metal carbonates or bicarbonates, such as sodium carbonate, sodium bicarbonate, potassium carbonate or potassium bicarbonate, alkali metal acetates, such as sodium acetate or potassium acetate, alkaline earth metal hydroxides, such as calcium hydroxide, or organic bases, such as triethylamine, pyridine, lutidine, collidine or quinoline. A further preferred embodiment of the esterification consists in first converting the alcohol or phenol into the sodium or potassium alcoholate or phenate, respectively, for example by treatment with ethanolic sodium hydroxide or potassium hydroxide solution, isolating this alcoholate or phenate and suspending it, together with sodium bicarbonate or potassium carbonate, in acetone or diethyl ether with stirring and adding a solution of the acid chloride or an hydride in diethyl ether, acetone or DM, to this suspension, preferably at temperatures between about $-25°$ and $+20°$.

Ethers according to the invention are obtainable by etherifying the corresponding hydroxyl compounds, preferably corresponding phenols, the hydroxyl compound being preferably first converted into a corresponding metal derivative, for example into the corresponding alkali metal alcoholate or alkali metal phenate, by treatment with NaH, NaNH$_2$, NaOH, KOH, Na$_2$CO$_3$ or K$_2$CO$_3$. This alcoholate or phenate can then be reacted with the corresponding alkylhalide or sulfonate or dialkyl sulfate, preferably in aninert solvent, such as acetone, 1,3-dimethoxyethane, DMF or dimethyl sulfoxide, or an excess of aqueous or aqueous-alcoholic NaOH or KOH, at temperatures between about 20° and 100° C.

As well as one or more compounds according to the invention, the liquid-crystal media according to the invention preferably contain, as further constituents, 2 to 40, in particular 4 to 30, components. Very particularly preferably these media contain 7 to 25 components as well as one or more compounds according to the invention. These further constituents are preferably selected from nematic or nematogenic (monotropic or isotropic) substances, in particular substances belonging to the classes of azoxybenzenes, benzylideneanilines, biphenyls, terphenyls, phenyl or cyclohexyl benzoates, phenyl or cyclohexyl cyclohexanecarboxylates, phenyl or cyclohexyl cyclohexylbenzoates, phenyl or cyclohexyl cyclohexylhexanecarboxylates, cyclohexylphenyl benzoates, cyclohexanecarboxylic acid or cyclohexylcyclohexanecarboxylic acid, phenylcyclohexanes, cyclohexylbiphenyls, phenylcyclohexylcyclohexanes cyclohexylcyclohexanes, cyclohexylcyclohexenes, cyclohexylcyclohexylcyclohexenes, 1,4-bis-cyclohexylbenzenes, 4,4'-bis-cyclohexylbiphenyls, phenylpyrimidines, cyclohexylpyrimidines, phenylpyridines, cyclohexylpyridines, phenyldioxanes, cyclohexyldioxanes, phenyl-1,3-dithianes, cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)-ethanes, 1-cyclohexyl-2-biphenylylethanes, 1-phenyl-2-cyclohexylphenylethanes, optionally halogenated stilbenes, benzyl phenyl ethers, tolanes and substituted cinnamic acids. The 1,4-phenylene groups in these compounds can also be fluorinated.

The most important compounds which are suitable for use as further constituents of media according to the invention can be characterized by means of the formulae 1, 2, 3, 4 and 5:

| | |
|---|---|
| R'-L-E-R" | 1 |
| R'-L-COO-E-R" | 2 |
| R'-L-OOC-E-R" | 3 |
| R'-L-CH$_2$CH$_2$-E-R" | 4 |
| R'-L-C≡C-E-R" | 5 |

In the formulae 1, 2, 3, 4 and 5, L and E, which can be identical or different, independently of one another are each a divalent radical belonging to the group composed of —Phe—, -Cyc—, —Phe—Phe—, —Phe—Cyc—, —Cyc—Cyc—, —Pyr—, —Dio—, —G—Phe— and —G—Phe— and —G—Cyc—and mirror images thereof, Phe being 1,4-phenylene which is unsubstituted or substituted by fluorine, Cyc being trans-1,4-cyclohexylene or 1,4-cyclohexenylene, Pyr being pyrimidine-2,5-diyl or pyridine-2,5-diyl, Dio being 1,3-dioxane-2,5-diyl and G being 2-(trans-1,4-cyclohexyl)-ethyl, pyrimidine-2,5-diyl, pyridine-2,5-diyl or 1,3-dioxane-2,5-diyl.

Preferably, one of the radicals L and E is Cyc, Phe or Pyr. E is preferably Cyc, Phe or Phe—Cyc. The media according to the invention preferably contain one or more components selected from the compounds of the formulae 1, 2, 3, 4 and 5 which L and E are selected from the group comprising Cyc, Phe and Pyr, and, at the same time, one or more components selected from the compounds of the formulae 1, 2, 3, 4 and 5 in which one of the radicals L and E is selected from the group comprising Cyc, Phe or Pyr and the other radical is selected from the group comprising —Phe—Phe—, —Phe—Cyc—, —Cyc—Cyc—, —G—Phe— and —G—Cyc—, and, if appropriate, one or more components selected from the compounds of the formulae 1, 2, 3, 4 and 5 in which the radicals L and E are selected from the group comprising —Phe—Cyc—, —Cyc—Cyc—, —G—Phe— and —G—Cyc—.

In the compounds of the partial formulae 1a, 2a, 3a, 4a and 5a, R' and R" independently of one another are each alkyl, alkenyl, alkoxy, alkenyloxy or alkanoyloxy having up to 8 carbon atoms. In most of these compounds R' and R" are different from one another, one of these radicals being alkyl or alkenyl in most cases. In the compounds of the partial formulae 1b, 2b, 3b, 4b, and 5b, R" is —CN, —CF$_3$, F, Cl or —NCS; R in this case has the meaning indicated for the compounds of the partial formulae 1a to 5a and is preferably alkyl or alkenyl. Other variants of the substituents envisaged are also customary, however, in the compounds of the formulae 1, 2, 3, 4 and 5. Many substances of this type or mixtures thereof are commercially available. All these substances can be obtained by methods known from the literature or analogously thereto.

As well as components belonging to the group of the compounds 1a, 2a, 3a, 4a and 5a (Group1), the media according to the invention also preferably contain components belonging to the group of the compounds 1b, 2b, 3b, 4b and 5b (Group 2), and the proportions thereof are preferably as follows:

Group 1: 20 to 90%, especially 30 to 90%,
Group 2: 10 to 80%, especially 10 to 50%, the sum of the proportions of the compounds according to the invention and of the compounds belonging to Groups 1 and 2 adding up to 100%.

The media according to the invention preferably contain 1 to 40%, particularly preferably 5 to 30%, of compounds according to the invention. Media containing more than 40%, in particular 45 to 90%, of compounds according to the invention are also preferred. The media preferably contain three, four or five compounds according to the invention.

The preparation of the media according to the invention is effected in a manner customary per se. As a rule, the components are dissolved in one another, preferably at an elevated temperature. The liquid-crystal phases according to the invention can be modified by means of suitable additives so that they can be used in any type of liquid-crystal display element hitherto disclosed. Additives of this type are known to those skilled in the art and are described in detail in the literature (H. Kelker/R. Hatz, Handbook of Liquid Crystals, Verlag Chemie, Weinheim, 1980). For example, pleochroic dyestuffs can be added in order to prepare colored guest-host systems, or substances can be added to alter the dielectric anisotropy, the viscosity and/or the orientation of the nematic phases.

EXAMPLES

The following examples are intended to illustrate the invention without limiting it. m.p.=melting point and c.p.=clear point. In the preceding and following text percentages are percent by weight; all temperatures are quoted in degrees Celsius. "Customary working up" means as follows: water is added, the mixture is extracted with methylene chloride, the phases are separated, the organic phase is dried and evaporated and the product is purified by crystallization and/or chromatography.

In addition, C means crystalline solid state, S means smectic phase (the index characterizes the type of phase), N means nematic state, Ch means cholesteric phase and I means isotropic phase. The number between two symbols indicates the transition temperature in degrees Celsius.

EXAMPLE 1

39 g of 1-(4-ethoxy-2,3-difluorophenyl)-4-(trans-4-n-propylcyclohexylethyl)-cyclohex-1-ene (obtainable as follows: 131 ml of a 1.6N solution of butyllithium (BuLi) in n-hexane are added dropwise, with exclusion of moisture and under an atmosphere of nitrogen, to a solution of 3.16 g of ethoxy-2,3-difluorobenzene and 23.2 g of tetramethylethylenediamine (TMEDA) in 400 ml of tetrahydrofuran (THF) at −70° C. The mixture is then stirred for 4 hours at −70° C. and 50 g of 4-(trans-4-n-propylcyclohexylethyl)-cyclohexanone in 100 ml of THF are then added slowly. The reaction mixture is allowed to warm up to room temperature slowly and is hydrolyzed with 1.5L of saturated ammonium chloride solution. The mixture is extracted with ether, and the ether phase is washed several times with water, dried and evaporated. The residue is taken up in 700 ml of ethanol, 70 ml of concentrated HCl are added and the mixture is boiled under reflux for 3 hours. 1.5L of water are then added and the mixture is extracted with methyl tert.-butyl ether. The ether phase is washed until neutral, dried and evaporated, and the residue is recrystallized. The product (m.p. 73° and c.p. 139°) and 50 g of DDQ in 250 ml of toluene are boiled under reflux for one hour. After cooling, the reaction mixture is filtered over silica gel together with toluene, the filtrate is evaporated and the residue is purified by chromatography. This gives 1-(trans-4-propylcyclohexyl)-2-(4'-ethoxy-2',3'-difluorobiphenyl-4-yl)-ethane, m.p. 64°, c.p. 144°.

EXAMPLE 2

0.21 mol of a 1.6N solution of n-BuLi in hexane are added dropwise, with exclusion of moisture and under an atmosphere of nitrogen, to a solution of 0.2 mol of trans-4-n-propylcyclohexylethyl-2,3-difluorobenzene (obtainable by alkylating 2,3-difluorobenzene with trans-4-n-propylcyclohexylethyl iodide at −85° C. in the presence of BuLi/potassium tertiary butylate (t-BuOK)/1,3-dimethyltetrahydro-2-(1H)-pyrimidinone (DMPU) and 0.2 mol of TMEDA in 400 ml of THF at −70° C. The mixture is stirred for 4 hours at −70° and 0.2 mol of 4-pentyloxycyclohexanone are then added. The reaction mixture is allowed to warm up to room temperature and is then hydrolyzed with dilute HCl, and the product is isolated in the customary manner. The product is taken up in toluene and heated to the boil in the presence of p-toluenesulfonic acid under a water separator. The toluene phase is then washed with water until neutral and is dried, and 0.4 mol of DDQ is added. The reaction mixture is brought to the boil. When the reaction is complete, the mixture is filtered through a silica gel column and then worked up in the customary manner. The product is purified by crystallization and chromatography. 1-(Trans-4-propyl-cyclohexyl)-2-(4'-pentyloxy-2,3-difluorobiphenyl-4-yl)-ethane is obtained.

The following were prepared analogously: 1-(trans-pentylcyclohexyl)-2-(4'-pentyl-2,3-difluorobiphenyl-4-yl)-ethane, m.p. 27°, c.p. 107°

EXAMPLE 3

0.2 mol of trans-4-n-pentylcyclohexylethyl-2,3-difluorobenzene in 500 ml of THF are reacted at −70° C., with exclusion of moisture and under an atmosphere of nitrogen, with 0.2 mol of TMEDA and 131 ml of a 1.6N solution of BuLi in hexane, and the mixture is stirred for 4 hours at −70° C. 50 g of 4-(trans-4-n-propylcyclohexylethyl)-cyclohexanone, dissolved in 100 ml of THF, are then added slowly. The reaction mixture is allowed to warm up to room temperature slowly and is hydrolyzed with dilute HCl and then worked up in the customary manner. The mixture of products thus obtained is taken up in toluene and heated to the boil, together with a little p-toluenesulfonic acid, under a water separator. The mixture is worked up in the customary manner, and the product, together with twice the molar amount of DDQ in toluene, is heated under reflux for 2 hours. The reaction mixture is then filtered through silica gel, the filtrate is evaporated and the residue is recrystallized. This gives 4-(trans-4-pentylcyclohexylethyl)-4'-(trans-4-propylcyclohexylethyl)-2,3-difluorobiphenyl.

EXAMPLE 4

0.1 mol of dicyclohexylcarbodiimide (DCC), dissolved in $CH_2Cl_2$, is added at 0° C. and with exclusion of moisture, to 0.1 mol of 4'-pentyl-2,3-difluorobiphenyl-4-ol (obtainable from 4'-pentyl-2,3-difluoro-4-methoxy-biphenyl by ether cleavage by means of HBr/glacial acetic acid), 0.1 mol of trans-4-n-pentylcyclohexanecarboxylic acid and a catalytic amount of 4-N,N'-dimethylaminopyridine (DMAP) in 300 ml of $CH_2Cl_2$. The mixture is then stirred for 12 hours at room temperature, the precipitated dicyclohexylurea is removed and the residue is worked up in the customary manner. The product is purified by crystallization. This gives 4'-pentyl-2,3-difluorobiphenyl-4-yl trans-4-n-pentylcyclohexanecarboxylate.

EXAMPLE 5

0.1 mol of 4'-n-pentyl-2,3-difluorobiphenyl-4-ol and 0.1 mol of trans-4-n-pentylcyclohexylmethyl iodide are heated to a gentle boil in the presence of 0.12 mol of anhydrous $K_2CO_3$ in dimethylformamide (DMF). When the reaction is complete, the mixture is worked up in the customary manner and the product is purified by chromatography and crystallization. Trans-4-n-pentylcyclohexylmethyl 4'-pentyl-2,3-difluorobiphenyl-4-yl ether, C (58° $S_C$) 30° $S_A$ 72° N 116° I is obtained.

The following are prepared analogously:

trans-4-n-pentylcyclohexylmethyl 4'-propyl-2,3-difluorobiphenyl-4-yl ether trans-4-n-propylcyclohexylmethyl 4'-propyl-2,3-difluorobiphenyl-4-yl ether trans-4-n-propylcyclohexylmethyl 4'-heptyl-2,3-difluorobiphenyl-4-yl ether trans-4-n-heptylcyclohexylmethyl 4'-heptyl-2,3-difluorobiphenyl-4-yl ether trans-4-n-octylcyclohexylmethyl 4'-pentyl-2,3-difluorobiphenyl-4-yl ether, C 57° $S_A$ 97° N 110° I

EXAMPLE 6

0.1 mol of octyloxy-2,3-difluorobenzene is metalated with 0.105 mol of a 1.6N solution of BuLi in hexane at −70° C. in 200 ml of THF and in the presence of 0.1 mol of TMEDA and, after 3 hours at −70° C., the mixture is reacted with 0.1 mol of 4-hexylcyclohexanone. The reaction mixture is allowed to warm up to room temperature and is hydrolyzed with saturated $NH_4Cl$ solution, extracted with MTB ether and worked up in the customary manner. The mixture of products is taken up in toluene and boiled, in the presence of 2 g of p-toluenesulfonic acid, under a water separator. The toluene solution is then washed with water until neutral and is dried, and 0.2 mol of DDQ is added. The mixture is boiled under reflux for 3 hours and is then cooled and run through a short silica gel column. The product is purified by crystallization. This gives 4'-heptyl-2,3-difluoro-4-octyloxybiphenyl. The following are prepared analogously: 4'-pentyl-2,3-difluoro-4-methoxybiphenyl, 4'-octyl-2,3-difluoro-4-octyloxybiphenyl, 4'-nonyl-2,3-difluoro-4-nonyloxybiphenyl, 4'-pentyl-2,3-difluorooctyloxybiphenyl, C 18° N 22.6° I

EXAMPLE 7

13.6 g of p-propylphenol and 32 g of 2,3-difluoro-4-pentyloxybiphenyl-4'-carboxylic acid (preparation of 4-pentyloxy-2,3-difluorobiphenyl-4'-carboxylic acid: pentyloxy-2,3-difluorobenzene is metalated with an equimolar amount of butyllithium and TMEDA under the customary conditions at −70° C. in THF, and the reaction mixture is then stirred for 4 hours at −70° C. and reacted, at the same temperature, with an equimolar amount of triisopropyl chloro-orthotitanate. The reaction mixture is allowed to warm up to −30° C. slowly and an equimolar amount of ethyl cyclohexanone-4-carboxylate is then added and stirring is continued for 12 hours while the mixture warms up slowly to room temperature. The reaction mixture is hydrolyzed with ice-cold dilute hydrochloric acid, stirred for a short time and filtered through Celite. The filtrate is extracted with MTB ether and the organic phase is dried and evaporated. The residue is taken up in ethanol, a little hydrochloric acid is added and the mixture is boiled under reflux for 12 hours. After water has been added, the product is isolated in the customary manner and is heated to the boil, together with twice the molar amount of DDQ in toluene. The mixture is then worked up in the customary manner and the ester is saponified at room temperature by means of a small excess of ethanolic KOH. The acid is purified by crystallization.) are initially taken in 250 ml of methylene chloride, together with a catalytic amount of DMAP, and a solution of 0.1 mol of DCC in methylene chloride is added dropwise at 0° C. The reaction mixture is stirred at room temperature for 12 hours and the precipitated dicyclohexylurea is then filtered off and the organic phase is worked up in the customary manner. This gives p-propylphenyl 4-pentyloxy-2,3-difluorobiphenyl-4'-ylcarboxylate.

The following are prepared analogously:

p-hexylphenyl 4-pentyloxy-2,3-difluorobiphenyl-4'-ylcarboxylate p-hexylphenyl 4-heptyloxy-2,3-difluorobiphenyl-4'-ylcarboxylate p-hexylphenyl 4-octyloxy-2,3-difluorobiphenyl-4'-ylcarboxylate p-hexylphenyl 4-nonyloxy-2,3-difluorobiphenyl-4'-ylcarboxylate p-heptylphenyl 4-octyloxy-2,3-difluorobiphenyl-4'-ylcarboxylate p-octylphenyl 4-octyloxy-2,3-difluorobiphenyl-4'-ylcarboxylate, $C_1$ 58.6° $C_2$ 63.6° $S_C$ 121° $S_A$ 139.1° N 144.5° I p-nonylphenyl 4-octyloxy-2,3-difluorobiphenyl-4'-ylcarboxylate p-hexyloxyphenyl 4-octyloxy-2,3-difluorobiphenyl-4'-ylcarboxylate
p-heptyloxyphenyl 4-octyloxy-2,3-difluorobiphenyl-4'-ylcarboxylate
p-octyloxyphenyl 4-octyloxy-2,3-difluorobiphenyl-4'-ylcarboxylate, C 83.8° $S_C$ 151.7° $S_A$ 154.9° N 165.4° I
4-octyl-3-fluorophenyl 4-octyloxy-2,3-difluorobiphenyl-4'-ylcarboxylate, 4-octyl-2-fluorophenyl 4-octyloxy-2,3-difluorobiphenyl-4'-ylcarboxylate, C 45.2°$S_C$ 84.3° N 120.7° I 4-octyloxy-2-fluorophenyl 4-octyloxy-2,3-difluorobiphenyl-4'-ylcarboxylate, C 56.7° $S_C$ 103° N 141.6° I 4-heptyl-2-fluorophenyl heptyl-2,3-difluorophenyl-4'-yl-carboxylate, C<20° N 83.4° I trans-4-pentylcyclohexyl 4-octyloxy-2,3-difluorobiphenyl-4'-ylcarboxylate C (67.8°$S_c$) 81.6° $S_A$ 97.5° N 132.4° I 4-heptyl-3-fluorophenyl 4-octyloxy-2,3-difluorobiphenyl-4'-ylcarboxylate, C 44.7° $S_C$ (41°) $S_A$ 146° I 4-octyloxy-3-fluorophenyl 4-octyloxy-2,3-difluorobiphenyl-4'-ylcarboxylate, C 83.6° $S_C$ 116° $S_A$ 162.9° I.

EXAMPLE 8

0.0055 mol of 4-octylbicyclo[2.2.2]octylcarboxyl (sic) chloride is added to a mixture of 0.0055 mol of 4'-octyloxy-2',3'-difluorobiphenyl-4-ol (prepared by hydrogenolytic cleavage of 4'-octyloxy-2',3'-difluoro-4-benzyloxybiphenyl, which is obtained by coupling 4-octyloxy-2,3-difluorophenyl diisopropyl hydroxytitanate with p-benzyloxybromobenzene using tetrakis(triphenylphosphine)palladium (0) as catalyst), 20 ml of methylene chloride and 1 ml of triethylamine. After stirring for 24 hours at 20° C., 4'-octyloxy-2',3'-difluorobiphenyl-4-yl 4-octylbicyclo [2.2.2] octyl-carboxylate, C 57.1° $S_C$ 128.5° $S_A$ 156° N 177.5° I is obtained after working up in the customary manner.

The following are prepared analogously:

4'-octyloxy-2',3'-difluorobiphenyl-4-yl trans-4-heptylcyclo-hexylcarboxylate, C 53° $S_C$ 132.8° $S_A$ 144.4° N 162° I
4'-octyloxy-2',3'-difluorobiphenyl-4-yl trans-4-heptylcyclohexylcarboxylate
4'-octyloxy-2',3'-difluorobiphenyl-4-yl trans-4-hexylcyclohexylcarboxylate C 45° $S_c$ 129° $S_A$ 135.7° N 166.3° I
4'-octyloxy-2',3'-difluorobiphenyl-4-yl trans-4-octylcyclohexylcarboxylate C 56° $S_c$ 133.6° $S_A$ 147° N 157° I
4'-octyloxy-2',3'-difluoro-4-acetoxybiphenyl
4'-octyloxy-2',3'-difluoro-4-propionyloxybiphenyl
4'-octyloxy-2',3'-difluoro-4-butyryloxybiphenyl
4'-octyloxy-2',3'-difluoro-4-pentanoyloxybiphenyl
4'-octyloxy-2',3'-difluoro-4-hexanoyloxybiphenyl
4'-octyloxy-2',3'-difluoro-4-heptanoyloxybiphenyl C 62.9° I
4'-octyloxy-2',3'-difluoro-4-octanoyloxybiphenyl C 54.9° $S_C$ 63.0° N 66.5° I
4'-octyloxy-2',3'-difluoro-4-nonanoyloxybiphenyl, C 58° $S_C$ 63.1° N 63.5° I
4'-octyloxy-2',3'-difluoro-4-(4-methylhexanoyloxy)-biphenyl C 38° SC (32.5°) N (35.5°) I
4'-octyloxy-2',3'-difluoro-4-decanoyloxybiphenyl, C 51.8° $S_C$ 71° I.

EXAMPLE 9

0.15 mol of a solution of n-BuLi in hexane is added dropwise to a mixture of 0.1 mol of 4'-n-pentyl-2,3-difluorobiphenyl (prepared from 1,2-difluorobenzene and 4-pentylcyclohexanone analogously to Example 3), in 250 ml of THF and 0.1 mol of potassium tert. butylate at −90° C. After stirring for 10 minutes at −85° C. a solution of 0.1 mol of 1-(4-propylphenyl)-2-iodoethane in 50 ml of THF and 2 ml of DMPU is added dropwise. After warming up to −40° C. and customary work-up 1-(4'-n-pentyl-2,3-difluorobiphenyl-4-yl)-2-(4-propylphenyl)-ethane is obtained.

The following are prepared analogously:
1-(4'-pentyl-2,3-difluorobiphenyl-4'-yl)-2-(4-ethyl-phenyl)-ethane
1-(4'-pentyl-2,3-difluorobiphenyl-4'-yl)-2-(4-butyl-phenyl)-ethane
1-(4'-pentyl-2,3-difluorobiphenyl-4'-yl)-2-(4-pentyl-phenyl)-ethane
1-(4'-pentyl-2,3-difluorobiphenyl-4'-yl)-2-(4-hexyl-phenyl)-ethane
1-(4'-pentyl-2,3-difluorobiphenyl-4'-yl)-2-(4-heptyl-phenyl)-ethane
1-(4'-pentyl-2,3-difluorobiphenyl-4'-yl)-2-(4-octyl-phenyl)-ethane
1-(4'-propyl-2,3-difluorobiphenyl-4'-yl)-2-(4-ethyl-phenyl)-ethane
1-(4'-propyl-2,3-difluorobiphenyl-4'-yl)-2-(4-butyl-phenyl)-ethane
1-(4'-propyl-2,3-difluorobiphenyl-4'-yl)-2-(4-pentyl-phenyl)-ethane
1-(4'-propyl-2,3-difluorobiphenyl-4'-yl)-2-(4-hexyl-phenyl)-ethane
1-(4'-ropyl-2,3-difluorobiphenyl-4'-yl)-2-(4-heptyl-phenyl)-ethane
1-(4'-ropyl-2,3-difluorobiphenyl-4'-yl)-2-(4-octyl-phenyl)-ethane

EXAMPLE 10

1-(4-Propylphenyl)-2-(4'-pentyl-2',3'-difluorobiphenyl-4-yl)-ethane is obtained from 0.1 mol of 3-pentyl-1,2-difluorobenzene and 0.1 mol of 4-(2-(4-propylphenyl)ethyl)-cyclohexanone analogously to Example 1.

The following are obtained analogously:
1-(4-propylphenyl)-2-(4'-ethyl-2',3'-difluorobiphenyl-4-yl)-ethane
1-(4-propylphenyl)-2-(4'-propyl-2',3'-difluorobiphenyl-4-yl)-ethane
1-(4-propylphenyl)-2-(4'-butyl-2',3'-difluorobiphenyl-4-yl)-ethane
1-(4-propylphenyl)-2-(4'-hexyl-2',3'-difluorobiphenyl-4-yl)-ethane
1-(4-propylphenyl)-2-(4'-heptyl-2',3'-difluorobiphenyl-4-yl)-ethane
1-(4-propylphenyl)-2-(4'-octyl-2',3'-difluorobiphenyl-4-yl)-ethane
1-(4-ethylphenyl)-2-(4'-ethoxy-2',3'-difluorobiphenyl-4-yl)-ethane, C 63.7° N 101.2° I
1-(4-ethylphenyl)-2-(4'-propyl-2',3'-difluorobiphenyl-4-yl)-ethane
1-(4-ethylphenyl)-2-(4'-propyl-2',3'-difluorobiphenyl-4-yl)-ethane
1-(4-ethylphenyl)-2-(4'-hexyl-2',3'-difluorobiphenyl-4-yl)-ethane
1-(4-ethylphenyl)-2-(4'-heptyl-2',3'-difluorobiphenyl-4-yl)-ethane
1-(4-ethylphenyl)-2-(4'-octyl-2',3'-difluorobiphenyl-4-yl)-ethane The following examples relate to liquid-crystal media according to the invention:

EXAMPLE A

A liquid-crystal medium consisting of

7% of 2-p-heptyloxyphenyl-5-octylpyrimidine,
11% of 2-p-octyloxyphenyl-5-octylpyrimidine,
6% of 2-p-hexyloxyphenyl-5-nonylpyrimidine,
14% of 2-p-nonyloxyphenyl-5-nonylpyrimidine,
5% of 4'-octyl-2,3-difluoro-4-octyloxybiphenyl,
7% of 4'-nonyl-2,3-difluoro-4-nonyloxybiphenyl,
8% of p-hexylphenyl 4-pentyloxy-2,3-difluorobiphenyl-4'-carboxylate,
20% of r-1-cyano-cis-4-(4'-octyloxybiphenyl-4-yl)-1-octylcyclohexane,
12% of r-1-cyano-cis-4-(4'-octylbiphenyl-4-yl)-1-butylcyclohexane and
10% of optically active p-(5-heptylpyrimidin-2-yl)-phenyl 2-cyano-2-methylhexanoate
exhibits $S_c^*$ 59° $S_A$ 61° Ch 78° I and a spontaneous polarization of 18 nC/cm at room temperature.

EXAMPLE B

A nematic liquid-crystal medium consisting of
10% of p-trans-4-ethylcyclohexyl-benzonitrile,
14% of p-trans-4-propylcyclohexyl-benzonitrile,
11% of p-trans-4-butylcyclohexyl-benzonitrile,
19% of p-trans-4-pentylcyclohexyl-benzonitrile,
9% of 1-(trans-4-propylcyclohexyl)-2-(4'-ethoxy-2',3'-difluorobiphenyl-4-yl)-ethane,
8% of 1-(trans-4-propylcyclohexyl)-2-(4'-pentyloxy-2',3'-difluorobiphenyl-4-yl)-ethane,
3% of 4,4'-bis-(trans-4-propylcyclohexyl)-biphenyl,
5% of 4-(trans-4-pentylcyclohexyl)-4'-(trans-4-propylcyclohexyl)-biphenyl,
2% of trans-4-propylcyclohexyl trans,trans-4-propylcyclohexylcyclohexane-4'-carboxylate,
3% of trans-4-propylcyclohexyl trans,trans-4-butylcyclohexylcyclohexane-4'-carboxylate,
5% of 4'-pentyl-2,3-difluorobiphenyl-4-yl trans-4-pentylcyclohexanecarboxylate,
6% of trans-4-propylcyclohexyl trans-4-propylcyclohexanecarboxylate and
5% of trans-4-propylcyclohexyl trans-4-pentylcyclohexanecarboxylate
is distinguished by a broad range of operating temperatures, low birefringence and a low threshold voltage.

EXAMPLE C

A liquid-crystal medium consisting of
16.87% of 4-heptyl-2-fluorophenyl 4'-heptyloxybiphenyl-4-yl carboxylate
16.87% of 4-heptyl-2-fluorophenyl 4'-heptyloxy-2'-fluorobiphenyl-4-yl carboxylate
16.87% of 4-octyl-2-fluorophenyl 4'-octyloxy-2',3'-difluorobiphenyl-4-ylcarboxylate
14% of 4-octyloxy-3-fluorophenyl 4-octyloxybenzoate
14% of 4-hexyloxy-3-fluorophenyl 4-octyloxybehzoate
10% of 4-octyloxy-2-fluorophenyl 4-pentylbenzoate
9% of 4-heptyl-3-fluorophenyl 4'-octyloxy-2',3'-difluorobiphenyl-4-ylcarboxylate and
2.4 % of chiral 1-cyano-2-methylpropyl 4'-octyloxybiphenyl-4-yl carboxylate
exhibits $S_C^*$ 71.8° $S_A$ 81° Ch 103.8° I and a high spontaneous polarization.

We claim:
1. A 4—$Q^1$—4'—$Q^2$—2,3-difluorobiphenyl compound wherein
$Q^1$ and $Q^2$ independently of one another are each R or R—$A^1$—$A^2$—Z in which
R is alkyl having 1-15 C atoms or alkenyl having 3-15 C atoms each of which is unsubstituted or monosubstituted by cyano or at least monosubstituted by fluorine or chlorine, and in which in each case one or two non-adjacent $CH_2$ groups can also be replaced by —O—, —CO—, —O—CO—, —CO—O— or —O—COO—;
Z is —COO—, —O—CO—, —$CH_2$O—, —O—$CH_2$—, or —$CH_2CH_2$—; and
$A^1$ and $A^2$ independently of one another are each 1,4-phenylene which is unsubstituted or substituted by one or two fluorine atoms, and in which one or two CH groups can also be replaced by N, or trans-1,4-cyclohexylene wherein one or two non-adjacent $CH_2$ groups can also be replaced by —O—, and one of the two groups $A^1$ and $A^2$ can also be a single bond.

2. A difluorobiphenyl compound according to claim 1, wherein said compound is of formula

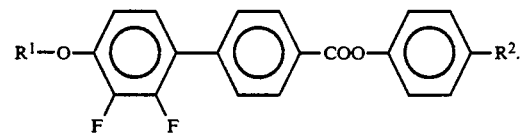

wherein $R^1$ and $R^2$ independently of one another are each alkyl having 1-15 C atoms.

3. In a liquid-crystalline medium comprising at least two liquid-crystal components, the improvement wherein at least one component is a compound according to claim 1.

4. In an electrooptical display element containing a dielectric, the improvement wherein said dielectric is a medium according to claim 3.

5. A compound according to claim 1, wherein said compound is of formula Ih or Ii:

   Ih

   Ii wherein $BPF_2$ is:

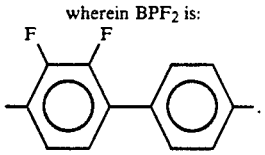

6. A compound according to claim 5, wherein said compound is of formula Ih1 or Ih2.

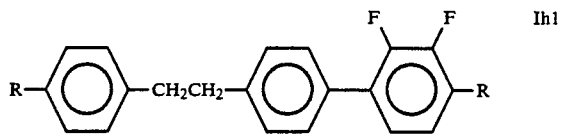   Ih1

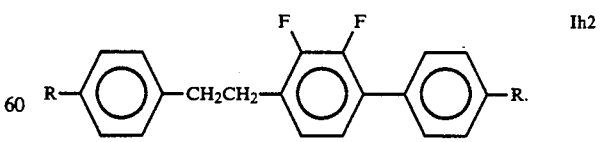   Ih2

7. A compound according to claim 5, wherein said compound is:
1-(trans-4-propyl-cyclohexyl)-2-(4'-pentyloxy-2,3-difluorobiphenyl-4-yl)-ethane, or
1-(trans-4-pentyl-cyclohexyl)-2-(4'-pentyl-2,3-difluorophenyl-4-yl)-ethane.

8. A compound according to claim 6, wherein said compound is:

1-(4'-pentyl-2,3-difluorobiphenyl-4-yl)-2-(4-ethyl-phenyl)-ethane,
1-(4'-pentyl-2,3-difluorobiphenyl-4-yl)-2-(4-butyl-phenyl)-ethane,
1-(4'-pentyl-2,3-difluorobiphenyl-4-yl)-2-(4-pentyl-phenyl)-ethane,
1-(4'-pentyl-2,3-difluorobiphenyl-4-yl)-2-(4-hexyl-phenyl)-ethane,
1-(4'-pentyl-2,3-difluorobiphenyl-4-yl)-2-(4-heptyl-phenyl)-ethane,
1-(4'-pentyl-2,3-difluorobiphenyl-4-yl)-2-(4-octyl-phenyl)-ethane,
1-(4'-propyl-2,3-difluorobiphenyl-4-yl)-2-(4-ethyl-phenyl)-ethane,
1-(4'-propyl-2,3-difluorobiphenyl-4-yl)-2-(4-propyl-phenyl)-ethane,
1-(4'-propyl-2,3-difluorobiphenyl-4-yl)-2-(4-butyl-phenyl)-ethane,
1-(4'-propyl-2,3-difluorobiphenyl-4-yl)-2-(4-pentyl-phenyl)-ethane,
1-(4'-propyl-2,3-difluorobiphenyl-4-yl)-2-(4-hexyl-phenyl)-ethane,
1-(4'-propyl-2,3-difluorobiphenyl-4-yl)-2-(4-heptyl-phenyl)-ethane, or
1-(4'-propyl-2,3-difluorobiphenyl-4-yl)-2-(4-octyl-phenyl)-ethane.

9. A 2,3-difluorobiphenyl compound according to claim 6, wherein said compound is:

1-(4-propylphenyl)-2-(4'pentyl-2',3'-difluorobiphenyl-4-yl)-ethane,
1-(4-propylphenyl)-2-(4'-ethyl-2',3'-difluorobiphenyl-4-yl)-ethane,
1-(4-propylphenyl)-2-(4'-propyl-2',3'-difluorobiphenyl-4-yl)-ethane,
1-(4-propylphenyl)-2-(4'-butyl-2',3'-difluorobiphenyl-4-yl)-ethane,
1-(4-propylphenyl)-2-(4'-hexyl-2',3'-difluorobiphenyl-4-yl)-ethane,
1-(4-propylphenyl)-2-(4'-heptyl-2',3'-difluorobiphenyl-4-yl)-ethane,
1-(4-propylphenyl)-2-(4'-octyl-2',3'-difluorobiphenyl-4-yl)-ethane,
1-(4-pentylphenyl)-2-(4'-ethoxy-2',3'-difluorobiphenyl-4-yl)-ethane,
1-(4-pentylphenyl)-2-(4'-propyl-2',3'-difluorobiphenyl-4-yl)-ethane,
1-(4-pentylphenyl)-2-(4'-hexyl-2',3'-difluorobiphenyl-4-yl)-ethane,
1-(4-pentylphenyl)-2-(4'-heptyl-2',3'-difluorobiphenyl-4-yl)-ethane, or
1-(4-pentylphenyl)-2-(4'-octyl-2',3'-difluorobiphenyl-4-yl)-ethane.

10. A 2,3-difluorobiphenyl of the formula, $$R-BPF_2-R \qquad [Ie]$$

wherein the two R groups are each independently alkyl having 1-15 C atoms or alkenyl having 3-15 C atoms of which is unsubstituted or monosubstituted by cyano or at least monosubstituted by fluorine or chlorine, and in which in each case one or two non-adjacent $CH_2$ groups can also be replaced by —O—, —CO—, —O—CO—, —CO—O— or —O—COO—, and $BPF_2$ is a group of the formula

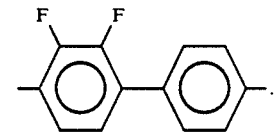

11. A difluorophenyl compound according to claim 10, wherein said compound is of the formula:

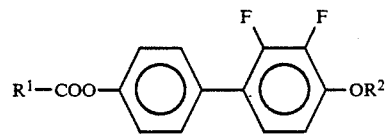

wherein $R^1$ and $R^2$ are each independently alkyl having 1-15 C atoms.

* * * * *